(12) United States Patent
Um

(10) Patent No.: US 12,213,575 B2
(45) Date of Patent: Feb. 4, 2025

(54) METHOD FOR PREPARING THE NAIL ART

(71) Applicant: GlluGa Inc., Cheonan-si (KR)

(72) Inventor: Jun Gil Um, Hwaseong-si (KR)

(73) Assignee: GlluGa Inc., Cheonan-si (KR)

( * ) Notice: Subject to any disclaimer, the term of this patent is extended or adjusted under 35 U.S.C. 154(b) by 965 days.

(21) Appl. No.: 17/134,941

(22) Filed: Dec. 28, 2020

(65) Prior Publication Data

US 2021/0219696 A1 Jul. 22, 2021

(30) Foreign Application Priority Data

Dec. 27, 2019 (KR) .......... 10-2019-0176049
Dec. 27, 2019 (KR) .......... 10-2019-0176087
Dec. 28, 2020 (KR) .......... 10-2020-0184807

(51) Int. Cl.
| | |
|---|---|
| *A45D 29/00* | (2006.01) |
| *A45D 31/00* | (2006.01) |
| *B29C 35/08* | (2006.01) |
| *B29C 43/02* | (2006.01) |
| *B29C 43/14* | (2006.01) |
| *B29C 43/20* | (2006.01) |
| *B29C 43/58* | (2006.01) |
| *B29L 31/00* | (2006.01) |

(52) U.S. Cl.
CPC .......... *A45D 29/001* (2013.01); *A45D 31/00* (2013.01); *B29C 35/0805* (2013.01); *B29C 43/021* (2013.01); *B29C 43/146* (2013.01); *B29C 43/203* (2013.01); *B29C 43/58* (2013.01); *B29C 2035/0827* (2013.01); *B29C 2043/147* (2013.01); *B29C 2043/5808* (2013.01); *B29C 2043/5816* (2013.01); *B29L 2031/722* (2013.01)

(58) Field of Classification Search
None
See application file for complete search history.

(56) References Cited

U.S. PATENT DOCUMENTS

| | | |
|---|---|---|
| 9,149,106 B2 | 10/2015 | Park |
| 9,655,429 B2 | 5/2017 | Park |
| 9,655,430 B2 | 5/2017 | Park |
| 10,376,024 B2 | 8/2019 | Yu et al. |
| 2014/0130820 A1 | 5/2014 | Chang |
| 2014/0251360 A1 | 9/2014 | Kim et al. |
| 2018/0168295 A1* | 6/2018 | Yu .................. B32B 27/08 |
| 2019/0151223 A1 | 5/2019 | Sheran et al. |
| 2019/0328090 A1 | 10/2019 | Yu et al. |

FOREIGN PATENT DOCUMENTS

| | | |
|---|---|---|
| KR | 10-2000-0051193 A | 8/2000 |
| KR | 10-2001-0104822 A | 11/2001 |
| KR | 10-1052256 B1 | 7/2011 |
| KR | 10-1087655 B1 | 12/2011 |
| KR | 10-1128344 B1 | 3/2012 |

(Continued)

*Primary Examiner* — Robert J Grun
(74) *Attorney, Agent, or Firm* — Merchant & Gould P.C.

(57) ABSTRACT

A method for preparing a nail art includes: applying a pressure to a laminate including a pre-substrate layer and a pre-coating layer by a mold to form a nail art including a substrate layer and a coating layer from the laminate, wherein when the pressure is applied, a temperature of the mold is 60° C. to 160° C., and the pressure is applied at 6 MPa to 12 MPa.

14 Claims, 10 Drawing Sheets

(56) References Cited

FOREIGN PATENT DOCUMENTS

| | | |
|---|---|---|
| KR | 10-2012-0106070 A | 9/2012 |
| KR | 10-1179955 B1 | 9/2012 |
| KR | 10-1291608 B1 | 8/2013 |
| KR | 10-1342492 B1 | 12/2013 |
| KR | 10-2017-0043180 A | 4/2017 |
| KR | 10-1797203 B1 | 11/2017 |
| KR | 10-1882174 B1 | 7/2018 |
| KR | 10-2019-0014044 A | 2/2019 |
| KR | 10-2019-0017832 A | 2/2019 |
| KR | 10-2019-0017833 A | 2/2019 |
| KR | 10-1949267 B1 | 2/2019 |
| KR | 10-2019-0091056 A | 8/2019 |

\* cited by examiner

METHOD FOR PREPARING THE NAIL ART

TECHNICAL FIELD

Cross-Reference to Related Application

This application claims the benefit of priority to Korean Patent Application Nos. 10-2019-0176049 filed on Dec. 27, 2019, 10-2019-0176087 filed on Dec. 27, 2019, and 10-2020-0184807 filed on Dec. 28, 2019, the entire contents of which are incorporated herein by reference.

TECHNICAL FIELD

The present disclosure relates to a method for preparing a nail art, the nail art being characterized by having a novel shape.

BACKGROUND

The beauty industry has been acceleratedly developed and subdivided simultaneously, as one way of expression of physical beauty pursued by humans. In particular, the beauty industry began to be popularized among ordinary people together with rapid market expansion after the 20th century. In the beauty industry, nail art has been recently rapidly developed as an essential element of expression arts for the body regardless of age group and gender.

Originally, nail art is one of the ways for beautifully decorating the human body as a field of beauty arts, and the length, shape, or color of nail arts has been expressed by reflecting changes and values of the culture of the times.

Among the nail arts, a nail art in an artificially manufactured nail or toenail shape (often called a nail art sticker) is used by many people. In the past, the nail art was manufactured in a curved shape like a nail or toenail shape and supplied to consumers. However, since each person has different nail or toenail shape (in particular a curvature radius), it was difficult to closely adhere a nail art having an already curved shape to a nail or toenail of a consumer.

As a method of solving the problem, a nail art including a UV-curable raw material has been recently spotlighted. Specifically, consumers deforms the nail art to fit their nail or toenail and irradiate UV thereon to cure the nail art. Accordingly, the nail art is closely adhered to the consumers' nail or toenail, thereby improving adhesive strength of the nail art.

Meanwhile, a conventional nail art is formed so that a side surface of the nail art is close to vertical to an upper surface of the nail art. Referring to FIG. 2, the side surface 100b and the upper surface 100a of the nail art 100 are almost vertical to each other. Accordingly, an outer peripheral portion of the conventional nail art is easily worn out during consumer's lives and the nail art is easily released from a nail or toenail by external shock. Such problems occur more seriously due to the small thickness of the nail art. In addition, since the side surface 100b and the upper surface 100a of the nail art are almost vertical to each other, a direction in which light is reflected is excessively limited, and thus, the nail art does not look three-dimensional to lose the purpose of beauty.

RELATED ART DOCUMENTS

Patent Documents (Patent Document 1) Korean Patent Laid-Open Publication No. 10-2019-0014044

DISCLOSURE

Technical Problem

An aspect of the present disclosure provides a method for preparing a nail art having a suppressed wear property and high attachment ability, and looking three-dimensional to maximize beauty characteristic.

Technical Solution

According to an aspect of the present disclosure, a method for preparing a nail art includes: applying a pressure to a laminate including a pre-substrate layer and a pre-coating layer by a mold to form a nail art including a substrate layer and a coating layer from the laminate, wherein when the pressure is applied, a temperature of the mold is 55° C. to 170° C., and the pressure is applied at 6 MPa to 12 MPa.

According to another aspect of the present disclosure, a method for preparing a nail art includes: applying a pressure to a laminate including a pre-substrate layer and a pre-coating layer by a mold to form a nail art including a substrate layer and a coating layer from the laminate, wherein the following Equation 1 is satisfied:

$$0.05 \text{ mm} \leq T_2 - T_1 \leq 0.5 \text{ mm} \quad [\text{Equation 1}]$$

wherein $T_1$ is a thickness of the nail art measured in an outer periphery of a lower surface of the nail art, and $T_2$ is a thickness of the nail art at a point of 1 mm away from an outermost side surface of the nail art toward a center of the nail art.

Effects of Invention

According to the method for preparing a nail art of the present disclosure, since the thickness of the nail art is increased in a direction from a vicinity of a side surface to a center of the nail art, wear resistance of the nail art may be improved and the nail art looks three-dimensional to maximize beauty characteristics. Furthermore, since the nail art in the form described above may be manufactured in a large amount at a time by a relatively simple method, improved mass production, a simplified process, and cost reduction are possible.

DETAILED DESCRIPTION

Figure 1:
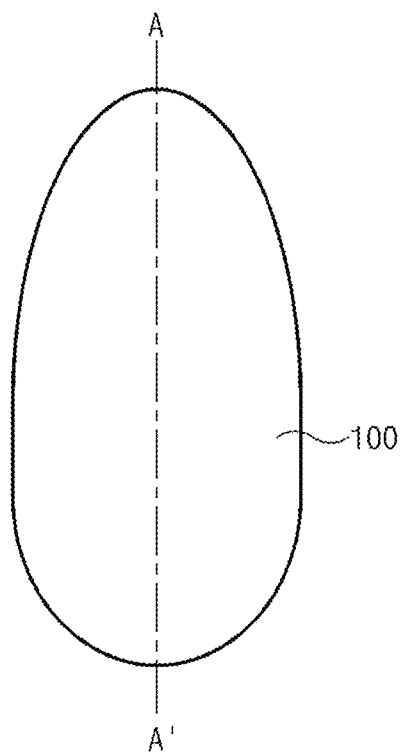
FIG. 1 is a schematic plan view for describing a nail art.
Figure 2:
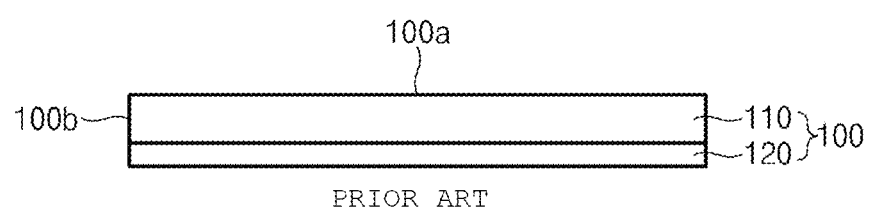
FIG. 2 is a schematic cross-sectional view of a conventional nail art confirmed along line A-A' of FIG. 1.
Figure 3:
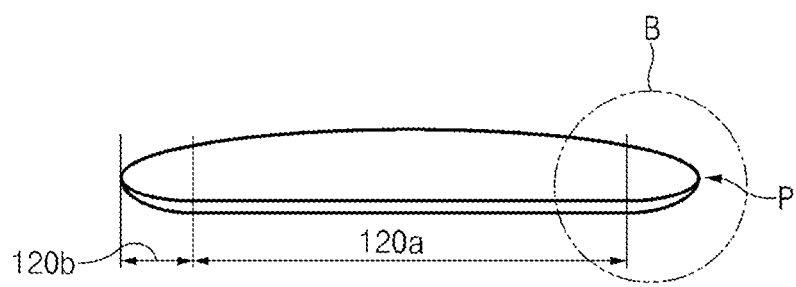
FIG. 3 relates to a nail art manufactured by the method for preparing a nail art according to an exemplary embodiment of the present disclosure, and is a schematic cross-sectional view of the nail art of the present disclosure, confirmed along line A-A' of FIG. 1.

Since the present disclosure may be variously modified and have several exemplary embodiments, specific exemplary embodiments will be shown in the accompanying drawings and be described in detail in a detailed description.

However, it is to be understood that the present disclosure is not limited to a specific exemplary embodiment, but includes all modifications, equivalents, and substitutions without departing from the scope and spirit of the present disclosure. When it is determined that the detailed description of the known art related to the present disclosure may obscure the gist of the present disclosure, the detailed description thereof will be omitted.

Terms used in the present specification are used only in order to describe specific exemplary embodiments rather than limiting the present disclosure. Singular forms are intended to include plural forms unless otherwise indicated contextually.

It will be further understood that in the present disclosure, the term such as "comprises" or "have" specifies the presence of stated features, numerals, steps, operations, constituent elements, parts, or a combination thereof, but does not preclude the presence or addition of one or more other features, numerals, steps, operations, constituent elements, parts, or a combination thereof.

In the present disclosure, being disposed or positioned "on" a subject may mean not only being present on the subject in a directly abutting state but also being disposed or positioned on the subject in a spaced state.

A thickness measured in the present disclosure may be confirmed by equipment of VHX-970F available from Keyence.

In the present disclosure, the word "flat" means that there is no bend or step, or even in the case in which there is, in a very low level to be neglected. For example, an error range may be ±0.01 mm or less.

Hereinafter preferred exemplary embodiments of the present disclosure will be described in detail with reference to the accompanying drawings. Prior to that, terms and words used in the present specification and claims are not to be construed as having a general or dictionary meaning but are to be construed as having meaning and concepts meeting the technical ideas of the present disclosure, based on a principle that the inventors may appropriately define the concepts of terms in order to describe their own inventions in best mode.

Therefore, since the configurations described in the exemplary embodiments and drawings of the present disclosure are merely most preferable exemplary embodiment but do not represent all of the technical spirit of the present disclosure, the present disclosure should be construed as including all the changes, equivalents, and substitutions included in the spirit and scope f the present disclosure at the time of filing this application.

<Method for Preparing Nail Art>

A nail art means an artificial laminate structure manufactured for being attached to a nail or toenail. Considering the use to be attached, it is also called a nail sticker or a nail art sticker. Specifically, when consumers are supplied with the nail art, the consumers attach the nail art on their nail or toenail while deforming the nail art to closely adhere the nail art on a nail or toenail, and then may irradiate UV to cure the nail art.

The method for preparing a nail art according to an exemplary embodiment of the present disclosure includes applying a pressure to a laminate including a pre-substrate layer and a pre-coating layer by a mold to form a nail art including a substrate layer and a coating layer from the laminate, wherein when the pressure is applied, a temperature of the mold is 55° C. to 170° C., and the pressure may be applied at 6 MPa to 12 MPa. The laminate may include a pre-substrate layer and a pre-coating layer disposed on the pre-substrate layer. The pre-substrate layer and the pre-coating layer mean configurations of which a part forms a substrate layer and a coating layer after the manufacturing process is finished.

The pre-coating layer may have a thickness of 200 μm to 500 μm, specifically 250 μm to 350 μm. When the range is satisfied, a good bending sense for use on a nail is provided.

The laminate may have a thickness of 400 μm to 650 μm, specifically 350 μm to 480 μm. When the range is satisfied, a good thickness sense for use on a nail is provided for consumers.

The pre-coating layer may include a UV-curable raw material, a photoinitiator, and a resin.

Since the UV-curable raw material is included in the pre-coating layer, consumers who purchased the nail art may deform the nail art so to be closely adhered to their nail or toenail, and then irradiate UV to cure the nail art to fix the deformed nail art. Accordingly, the nail art and the nail/toenail may be joined to each other in a completely closely adhered state, thereby improving adhesive strength of the nail art. In addition, surface strength may be increased by a curing process after attachment.

The UV-curable raw material may include at least any one selected from the group consisting of urethane acrylate-based oligomers, polyester acrylate-based oligomers, polyether acrylate-based oligomers, epoxy acrylate-based oligomers, polycarbonate acrylate-based oligomers, silicone acrylate-based oligomers, and acryl acrylate-based oligomers.

Specifically, the UV-curable raw material may include at least any one of urethane acrylate-based oligomers, epoxy acrylate-based oligomers, and polyester acrylate-based oligomer, and more specifically, may include a urethane acrylate-based oligomer.

The urethane acrylate-based oligomer may be easily cured by UV and may have predetermined flexible physical properties even after curing, which is thus advantageous. In addition, a haze phenomenon may be minimized to maintain transparency of the coating layer.

The urethane acrylate-based oligomer may include at least any one selected from the group consisting of difunctional urethane acrylate-based oligomers, tetrafunctional urethane acrylate-based oligomers, and hexafunctional urethane acrylate-based oligomers.

Specifically, the urethane acrylate-based oligomer may include at least any one selected from the group consisting of PU210, Pu 280, PU640, and SC2404 available from Miwon Specialty Chemical Co., Ltd., and CN 9033 and CN 9047 available from SARTOMER.

The urethane acrylate-based oligomer may have a weight average molecular weight of 1,000 g/mol to 10,000,000 g/mol, specifically 1,000 g/mol to 100,000 g/mol. When the range is satisfied, the pre-coating layer of the nail art of the present disclosure may have appropriate flowability, and thus, the process is easily performed.

Since the epoxy acrylate-based oligomer has high reactivity, it has high hardness and good abrasiveness, is easily cured, has excellent flexibility, and may be stably cured even in contact with oxygen.

The epoxy acrylate-based oligomer has one functional group or two functional groups, and when it has one functional group, it shows ductility, and when it has more functional groups, rigidity or thermal stability is reinforced.

Specifically, the epoxy acrylate-based oligomer may include at least any one selected from the group consisting of PE210, PE 2120, and PE 250 available from Miwon Specialty Chemical Co., Ltd.

The epoxy acrylate-based oligomer may have a weight average molecular weight of 100 g/mol to 10,000 g/mol, specifically 500 g/mol to 6,000 g/mol. When the range is satisfied, the pre-coating layer has appropriate strength and viscosity, and thus, processability is good.

The polyester acrylate-based oligomer has excellent reactivity and better adhesive strength than the urethane acrylate-based oligomer and the epoxy acrylate-based oligomer.

The polyester acrylate-based oligomer usually uses an oligomer having four or six functional groups. Specifically, the polyester acrylate-based oligomer may include at least any one selected from the group consisting of PS4040, PS460, PS6300 Etermer 6311-100, 6312-100, and 6314C-60 available from Miwon Specialty Chemical Co., Ltd.

The polyester acrylate-based oligomer may have a weight average molecular weight of 500 g/mol to 50,000 g/mol, specifically 1,500 g/mol to 38,000 g/mol. When the range is satisfied, satisfactory hardness and adhesive strength may be obtained.

Within the pre-coating layer, the epoxy acrylate-based oligomer may be included at 10 parts by weight to 30 parts by weight, specifically 1 part by weight to 3 parts by weight with respect to 100 parts by weight of the urethane acrylate-based oligomer. Within the coating layer, the polyester acrylate-based oligomer may be included at 10 parts by weight to 20 parts by weight, specifically 2 parts by weight to 8 parts by weight with respect to 100 parts by weight of the urethane acrylate-based oligomer. When the composition is satisfied, rapid curing does not occur even in the case in which the pre-coating layer is exposed to the air, and durability may be maintained even after the nail art is attached. In addition, when the manufacturing method of the present disclosure is used, the nail art may be manufactured so that the thickness of the outer periphery of the nail art is gradually increased.

The UV-curable raw material may be included at 30 wt % to 58 wt %, specifically 45 wt % to 55 wt % in the pre-coating layer. When the range is satisfied, the nail art may be manufactured so that the thickness of the outer periphery of the nail art is gradually increased.

The photoinitiator serves to initiate a polymerization reaction by UV irradiation. Specifically, the photoinitiator may be a UV photoinitiator.

The photoinitiator may have an absorption wavelength band in a range of 200 nm to 600 nm.

The photoinitiator may include at least any one selected from the group consisting of trimethylbenzoyl phosphine oxide, phenylbis(2,4,6-trimethylbenzoyl) phosphine oxide, and 2-benzyl-2-(dimethylamino)-1-[4-(4-morpholinyl)phenyl]-1-butanone.

The photoinitiator may be included at 0.1 wt % to 20 wt %, specifically 1 wt % to 10 wt % in the pre-coating layer. When the range is satisfied, a user may easily perform curing by UV irradiation.

The resin may serve to maintain the form by controlling the flowability of the pre-coating layer. In addition, since a coating layer forming composition for forming the pre-coating layer may have an appropriate viscosity by the resin, the coating layer may be prepared in a desired form. In addition, since the basic physical properties of the resin form the basic physical properties of the coating layer, consumers may easily touch and bend the nail art.

The resin may be a thermoplastic resin having a glass transition temperature ($T_g$) of 30° C. to 200° C., specifically 50° C. to 150° C. In this case, it is possible to manufacture the nail art well, considering the temperature of the mold used in the manufacturing method of the present disclosure.

The resin may include at least any one selected from the group consisting of acryl-based resins, nitrocellulose resins, urethane-based resins, acetic acid resins, ester-based resins, vinyl chloride resins, and styrene resins.

In particular, the nitrocellulose resin may include HRS ⅛-20 SS type ⅛-½ from Korea CNC Ltd. When the nitrocellulose resin includes RS ⅛-¼, the viscosity is low, so that a high solid content may be maintained. A nitrogen content of the nitrocellulose resin may be 11.5% to 12.2%, and specifically, may be divided into ⅛ seconds-20 seconds depending on a viscosity. When the range is satisfied, a low viscosity may be maintained to increase the solid content. The resin may be included at 40 wt % to 55 wt %, specifically 20 wt % to 30 wt % in the pre-coating layer. When the range is satisfied, stickiness of the nail art disappears so that there is no problem even in handling at room temperature and gloss may be increased.

A weight ratio of the UV-curable raw material and the resin may be 35:65 to 65:30, specifically 45:55 to 55:45. When the range is satisfied, the outer periphery portion of the manufactured nail art may form a gentle curve, and thus, wear resistance may be increased and a cosmetic effect may be maximized.

The UV-curable raw material may be included at 30 wt % to 58 wt %, the photoinitiator may be included at 0.1 wt % to 20 wt %, and the resin may be included at 40 wt % to 55 wt %, in the pre-coating layer. When the ranges are satisfied, the pre-coating layer may have soft physical properties in the manufacturing process, and thus, the finally manufactured coating layer may have the form described in the exemplary embodiment described above.

Figure 8:
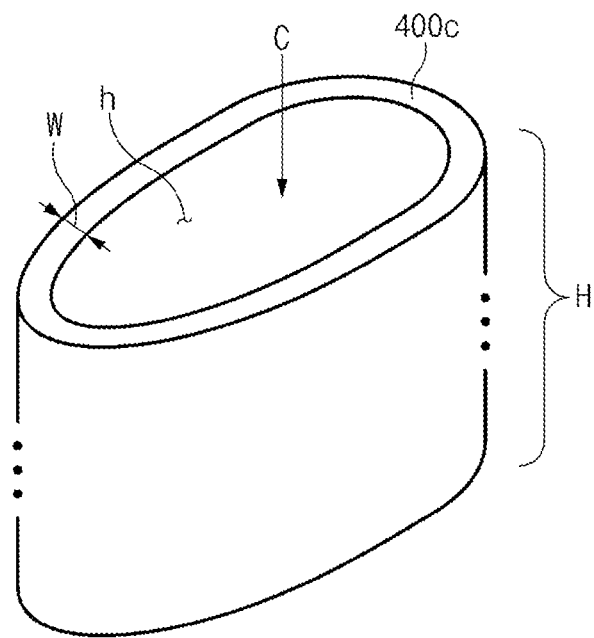
FIG. 8 is a schematic view of a mold used in the method for preparing a nail art according to an exemplary embodiment of the present disclosure.
Figure 9:
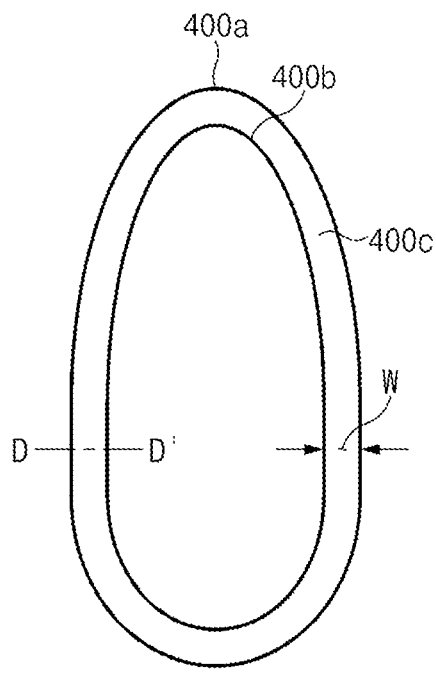
FIG. 9 is a schematic plan view as viewed from a C direction of FIG. 8.
Figure 10:
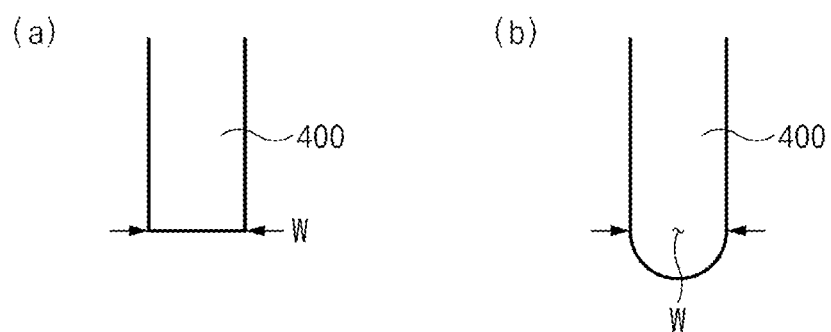
FIG. 10 is a schematic cross-sectional view taken along line D-D' of FIG. 9.

Referring to FIGS. 8 to 10, the mold 400 has a pressing surface 400c. The pressing surface 400c corresponds to a part which first comes into contact with the laminate. The pressing surface 400c of the mold 400 may be in the form of having an outer periphery 400a and an inner periphery 400b spaced apart from the outer periphery 400a. Specifically, an empty space surrounded by the inner periphery 400b corresponds to a hole h in the nail art form, and the hole h may penetrate the mold 400 or may correspond to a recessed portion which is not penetrated. A width (W) of the pressing surface 400c may be 0.3 mm to 1.5 mm, specifically 0.4 mm to 0.7 mm, and more specifically 0.45 mm to 0.7 mm. When the range is satisfied, a side surface of the finally manufactured nail art may have a gentle curve, thereby improving wear resistance to maximize a cosmetic effect. In addition, the laminate may be cut well to decrease a defective rate and improve processability.

The pressing surface may be flat (see (a) of FIG. 10), or may have a protruding form (see (b) of FIG. 10). In the case of the protruding form, the protrusion may be pressed in the process of applying a pressure to have a flat shape instantaneously. A width of the pressing surface means the width of the pressing surface shown when the pressing surface is pressed by pressure, considering all of the cases.

Figure 7:
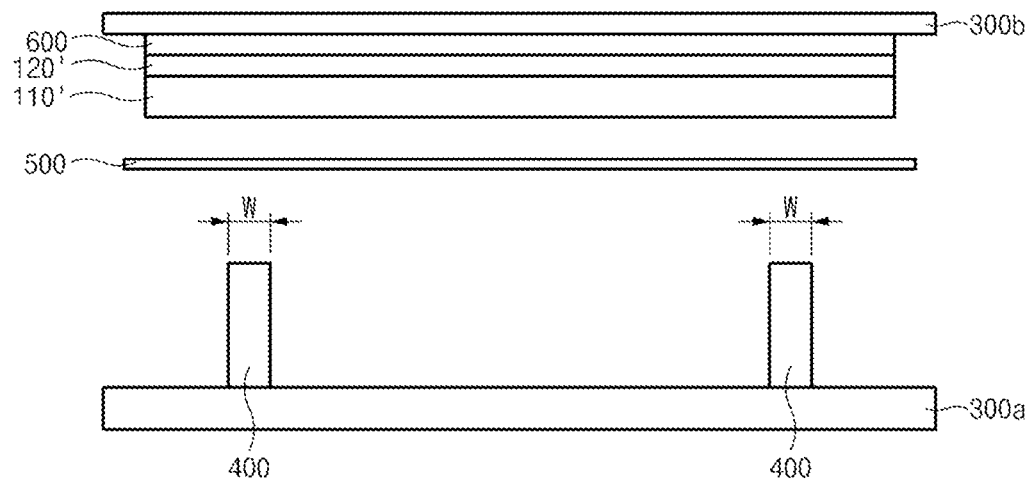
FIG. 7 is a schematic view for describing the method for preparing a nail art according to an exemplary embodiment of the present disclosure.
Figure 7:
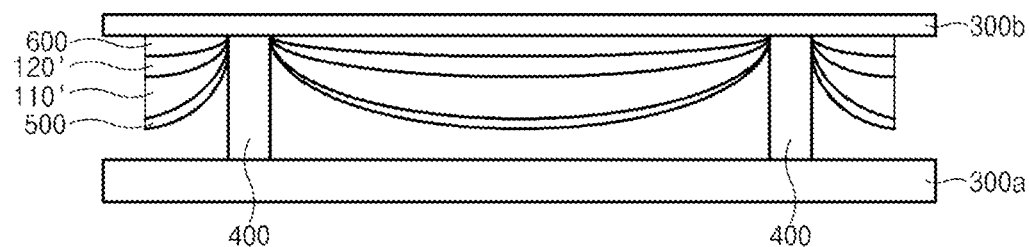
Figure 7:
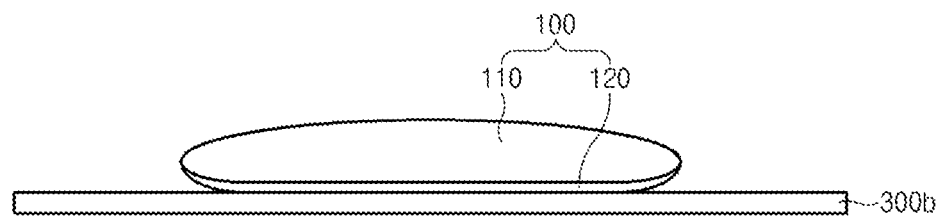

A height (H) of the mold may be larger than the thickness of the laminate. Specifically, the height may be 12 mm to 24 mm. Referring to FIG. 7, in the process of applying a pressure, the laminate 100' is disposed on an upper plate 300b, and a lower plate 300a disposed on a lower surface of the mold 400 may be disposed on a lower portion of the pre-coating layer 110' of the laminate (see (a) of FIG. 7).

In some cases, a buffer layer 600 may be disposed between the laminate 100' and the upper plate 300b. The buffer layer 600 may serve to suppress wear and deformation of the mold 400. The buffer layer 600 may include bakelite. The buffer layer may have a thickness of 2 mm to 4 mm, but is not limited thereto.

In some cases, before applying a pressure, at least one or more process films 500 may be disposed between the pre-coating layer and the mold. The process film 500 may serve to obtain a desired form of the nail art.

A melting point of the process film may be higher than a temperature of the mold. Specifically, the process film may include at least any one selected from the group consisting of PET, polyimide, and oriented polypropylene.

One or more process films may be disposed between the pre-coating layer and the mold, and specifically one to three process films may be disposed. This may vary depending on the desired form of the nail art.

The process film may have a thickness of 9 µm to 188 µm, specifically 25 µm to 125 µm. When the range is satisfied, the form of the nail art may be easily adjusted.

Referring to (b) of FIG. 7, as the upper plate 300b and the lower plate 300a are closer to each other, the laminate 100' may be pressed by the mold 400 at a predetermined pressure.

When the process film is used, not only the laminate 100' but also the process film 500 may be pressed by the mold 400. The pressure may be 6 MPa to 12 MPa, specifically 6 MPa to 10 MPa. When the pressure is less than 6 MPa, the nail art is not easily punched and sufficient stress is not transferred to the laminate, so that it is difficult to manufacture the nail art in a desired form. When the pressure is more than 12 MPa, the laminate is damaged, so that a defective rate is excessively high.

A time to apply a pressure may be 1 second to 20 seconds, specifically 1 second to 10 seconds. When the range is satisfied, a nail art having a gently curved outer periphery may be manufactured.

When the pressure is applied, a temperature of the mold may be 55° C. to 170° C., specifically 60° C. to 120° C. When the range is satisfied, a nail art having a soft outer periphery may be obtained. When the temperature is lower than 55° C., it is difficult to deform the laminate in a desired form. When the temperature is higher than 170° C., it is difficult to punch the laminate, and the laminate is damaged, so that the defective rate is excessively high.

Referring to (c) of FIG. 7, after the process of applying a pressure, the laminate is cut, and as time passes after removing the mold (or the mold and the process film), the cut laminate has a nail art form including a coating layer 110 and a substrate layer 120. This is a result of partial action of restoring force of the coating layer and the substrate layer. That is, it means that in deriving the nail art form of the present disclosure, the composition of the nail art may be a main variable.

The coating layer may include a solvent. The solvent corresponds to a solvent used when the coating layer forming composition for preparing the coating layer is formed, and is removed by drying in a process of preparing the coating layer. However, some solvents may remain at a very low content in the coating layer.

Figure 4:
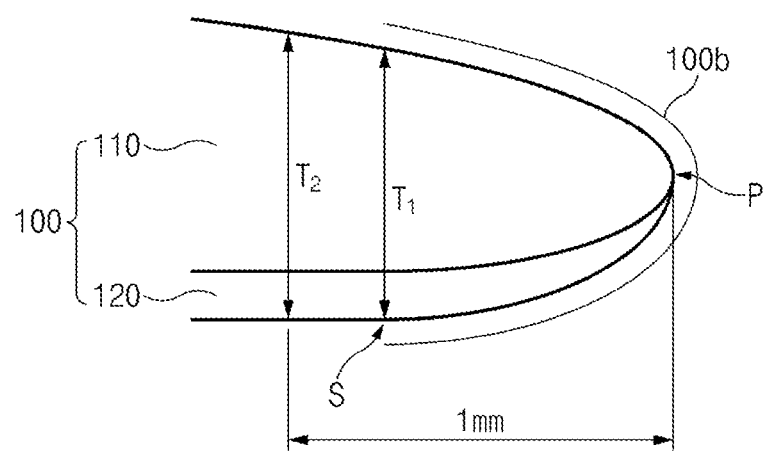
FIG. 4 is a drawing for describing a nail art manufactured by the method for preparing a nail art according to an exemplary embodiment of the present disclosure and an enlarged schematic cross-sectional view of part B of FIG. 3.
Figure 5:
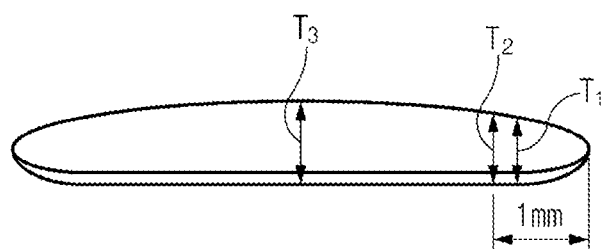
FIG. 5 relates to a nail art manufactured by the method for preparing a nail art according to an exemplary embodiment of the present disclosure, and is a schematic cross-sectional view of the nail art of the present disclosure confirmed along A-A' of FIG. 1.

The coating layer may be disposed on the substrate layer. Referring to FIG. 4, an upper surface of the substrate layer 120 and a lower surface of the coating layer 110 may face each other, or specifically be in contact with each other.

The substrate layer may include an adhesive layer. The adhesive layer imparts chemical adhesive strength to allow the nail art to be attached to a nail or toenail. Accordingly, the adhesive layer may form a lower surface of the nail art. The lower surface of the nail art of the present disclosure may be flat, which may mean that a lower surface of the adhesive layer may be flat. The adhesive layer includes an adhesive component, which may correspond to an adhesive component commonly used in the art.

The substrate layer may further include a design layer. The design layer may be disposed between the adhesive layer and the coating layer. The design layer may include at least any one of a color layer and a printed layer. The design layer may include a pigment imparting color to the nail art. The printed layer may include various materials for aesthetics of particles, mica, and the like for pattern expression.

The nail art may further include a design expression layer disposed on the coating layer. The design expression layer may show expressions such as matte, and may show expressions such as three-dimensional lines, a thick film type three-dimensional figure like a cone or a circular dome, or the like.

A substrate film may be disposed on the lower surface of the substrate layer. The substrate film may serve to prevent contamination of the adhesive layer to maintain adhesive strength until the nail art is used, and corresponds to a configuration to be removed when the nail art is used. The substrate film may include a component commonly used in the art. Referring to FIG. 4, an outer periphery(S) of a lower surface 120a of the nail art means a point where the lower surface 120a of the nail art is exposed to a side surface of the coating layer. That is to say, the nail art includes a flat lower surface 120a and in an end of the lower surface 120a, a curved portion 120b is extended, and a boundary point of the lower surface 120a and the curved portion 120b is regarded as the outer periphery S. A center of the nail art may mean a point positioned in a half or close to a half of a section length of the nail art.

The nail art may include a protrusion in a side surface. Referring to FIG. 4, a side surface 100b of the nail art means a surface of an area protruding from the outer periphery(S) of the lower surface of the nail art to the outside. In the protrusion, a height of the nail art may be decreased toward the outermost side surface of the nail art. That is, since the side surface of the nail art includes the protrusion so that the upper surface and the side surface of the nail art are not vertical to each other, exposure of the adhesive layer in the nail art is minimized to suppress contamination of the nail art, and a user may easily remove the nail art from the nail or toenail in the future. The protrusion may be formed of a curve. The method for preparing a nail art according to another exemplary embodiment of the present disclosure includes: applying a pressure to a laminate including a pre-substrate layer and a pre-coating layer by a mold to form a nail art including a substrate layer and a coating layer from the laminate, wherein the following Equation 1 is satisfied:

$$0.05 \text{ mm} \leq T_2 - T_1 \leq 0.5 \text{ mm} \quad \text{[Equation 1]}$$

wherein $T_1$ is a thickness of the nail art measured in an outer periphery of a lower surface of the nail art, and $T_2$ is a thickness of the nail art at a point of 1 mm away from an outermost side surface of the nail art toward a center of the nail art. Since the pre-substrate layer, the pre-coating layer, the laminate, the mold, the substrate layer, and the coating layer are the same as those described above for the exemplary embodiment, description thereof will be omitted. In addition, the nail art may be the same as the nail art of the exemplary embodiment described above. The coating layer may include a UV-curable raw material, a photoinitiator, and a resin.

The nail art may satisfy the following Equation 1:

$$0.05 \text{ mm} \leq T_2 - T_1 \leq 0.5 \text{ mm}. \quad \text{[Equation 1]}$$

Referring to FIG. 4, $T_1$ is a thickness of the nail art measured in the outer periphery(S) of the lower surface of the nail art, and $T_2$ is a thickness of the nail art at a point of 1 mm away from the outermost side surface (P) of the nail art toward the center of the nail art.

Equation 1 being satisfied means that the thickness of the nail art is decreased from the point of 1 mm away from the outermost side surface of the nail art toward the center of the nail art to the outermost side surface of the nail art, and thus, the nail art may look three-dimensional to maximize beauty characteristics. In addition, it may be suppressed that the nail art has an excessively angular shape at a vicinity of the border. Accordingly, wear of the nail art (specifically wear of the coating layer) is suppressed, attachment ability is high, and the nail art may look three-dimensional to maximize beauty characteristics.

When Equation 1 is not satisfied and $T_2 - T_1 < 0.05$ mm, an incline is not sensed, and thus, it is difficult to sense a difference from a conventional sticker (a sticker having a flat upper surface), and an angle at which light is reflected is limited, so that a cosmetic effect is not great. Furthermore, since there is a high possibility that an upper surface and a side surface in the outer periphery portion of the nail art are vertical to each other, wear of the outer periphery portion may easily occur. On the contrary, when Equation 1 is not satisfied and $T_2 - T_1 > 0.5$ mm, an inclination angle at the end is formed to be too sharp or there is no difference between the thickness portion of the nail art and $T_2$, and thus, three-dimensional characteristics may be deteriorated. In addition, a user may easily feel foreign body sensation by the sharp inclination angle.

More specifically, the nail art may satisfy the following Equation 1-1:

$$0.1 \text{ mm} \leq T_2 - T_1 \leq 0.4 \text{ mm}. \quad \text{[Equation 1-1]}$$

When Equation 1-1 is satisfied, wear resistance may be improved while a three-dimensional shape of the nail art is maintained, a defective rate may be decreased, and the shape is most similar to a nail art shape formed by using a conventional liquid nail art, and thus, it is convenient to use.

$T_2$ may be 0.4 mm to 0.56 mm, more specifically 0.41 mm to 0.5 mm. In addition, $T_1$ may be 0.05 mm to 0.35 mm, specifically 0.1 mm to 0.2 mm. When the range is satisfied, a slope of a range from $T_1$ to $T_2$ is in an appropriate level, and thus, the effect of the present disclosure may be exhibited.

A point at which the largest thickness ($T_3$) of the nail art is measured may be positioned closer to the center than a point of 1 mm away from the outer periphery of the nail art toward the center, and if necessary, may correspond to the center.

The largest thickness ($T_3$) of the nail art may be 0.5 mm to 0.8 mm, specifically 0.62 mm to 0.65 mm. When the range is satisfied, the upper surface of the coating layer may have a convex portion, and thus, the durability of the upper end of the nail art may be improved, and a direction in which light is reflected from the nail art may be more varied, and thus, the cosmetic effect may be maximized.

Specifically, the nail art may satisfy the following Equation 2:

$$0.05 \text{ mm} \leq T_3 - T_2 \leq 0.2 \text{ mm}. \quad \text{[Equation 2]}$$

When the range is satisfied, it is considered that the effect of the present disclosure may be exhibited. The range may be more specifically 0.1 mm $\leq T_3 - T_2 \leq$ 0.15 mm.

Figure 6:
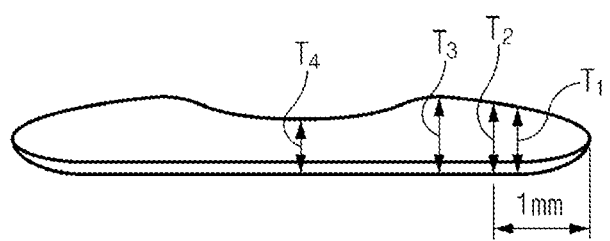
FIG. 6 relates to a nail art manufactured by the method for preparing a nail art according to an exemplary embodiment of the present disclosure, and is a schematic cross-sectional view of the nail art of the present disclosure, confirmed along line A-A' of FIG. 1.

The nail art may include a portion in which the thickness of the nail art is decreased between a point corresponding to $T_3$ and the center of the nail art. Specifically, referring to FIG. 6, a thickness $T_4$ smaller than $T_3$ may be shown between the point having a thickness $T_3$ and the center of the nail art (or in the center). More specifically, when viewed from the section of the nail art, a recessed portion may be present near the center of the nail art. This means that there is an area where the thickness of the nail art is increased and then decreased in a process from the outermost side surface toward the center of the nail art. Accordingly, the nail art looks more three-dimensional, thereby maximizing beauty characteristics. In addition, when a decoration is placed on the nail art, the decoration may be stably disposed.

The method for preparing a nail art introduced above may produce a large amount of nail arts at once, may shorten a process time, and may significantly reduce a defective rate.

Meanwhile, according to another exemplary embodiment of the present disclosure, a nail art manufactured by the manufacturing methods described above is provided. The characteristics of the nail art are the same as those introduced in the exemplary embodiments described above.

Hereinafter, preferred examples will be provided in order to assist in the understanding of the present disclosure, but it will be obvious that the following examples are only illustrative of the present disclosure, and various modifications and alterations may be made within the scope and technical idea of the present disclosure, and also it will be natural that these modifications and alterations may fall within the scope of the appended claims, to those skilled in the art.

EXAMPLES AND COMPARATIVE EXAMPLES

Example 1: Manufacture of Nail Art (1) Formation of Laminate

A urethane acrylate-based oligomer (PU210) as a UV-curable raw trimethylbenzoyl phosphine oxide (TPO) as material, a photoinitiator, and an acryl resin having a glass transition temperature of 40° C. and a nitrocellulose resin having a viscosity of ½ seconds as a resin were mixed with ethyl acetate and normal propyl acetate as a solvent, and the mixture was stirred to form an coating layer forming composition. A solid content of the coating layer forming composition was 45 wt %, and a weight ratio of the UV-curable raw material, the photoinitiator, and the resin in the solid content was 45:2:53. The coating layer forming composition was applied on a pre-substrate layer including a design layer and an adhesive layer, and then dried at 80° C. to form a pre-coating layer. A thickness of the pre-coating layer was 300 μm and a total thickness of the laminate was 400 μm.

(2) Application of Pressure

One process film having a thickness of 100 μm was disposed between the laminate and a mold (having a pressing surface of a width of 0.7 mm, a height of 24 mm, and an inner periphery having a nail art shape). Thereafter, a pressure was applied to the laminate with the process film interposed therebetween by the mold. The pressure was 10 MPa, and a temperature of the mold was 100° C. The pressure was applied for 6 seconds. Thus, the laminate was cut into the nail art shape.

(3) Obtainment of Nail Art

After removing the mold and the process film, a punched nail art was obtained.

Comparative Example 1: Manufacture of Nail Art

An experiment was performed in the same manner as in Example 1, except that the pressure was changed to 3 MPa, but the nail art was not punched.

Comparative Example 2: Manufacture of Nail Art

A nail art was manufactured in the same manner as in Example 1, except that the temperature of the mold when applying the pressure was changed to 50° C.

Experimental Example 1: Thickness Observation

Each of the nail arts of Example 1 and Comparative Example 2 was observed using equipment of VHX-970F available from Keyence, and the results are shown in Table 1.

TABLE 1

| | $T_1$ (mm) | $T_2$ (mm) | $T_2$-$T_1$ (mm) |
|---|---|---|---|
| Example 1 | 0.16 | 0.46 | 0.3 |
| Comparative Example 2 | 0.32 | 0.4 | 0.08 |

Experimental Example 2: Evaluation of Wear Degree

Figure 11:
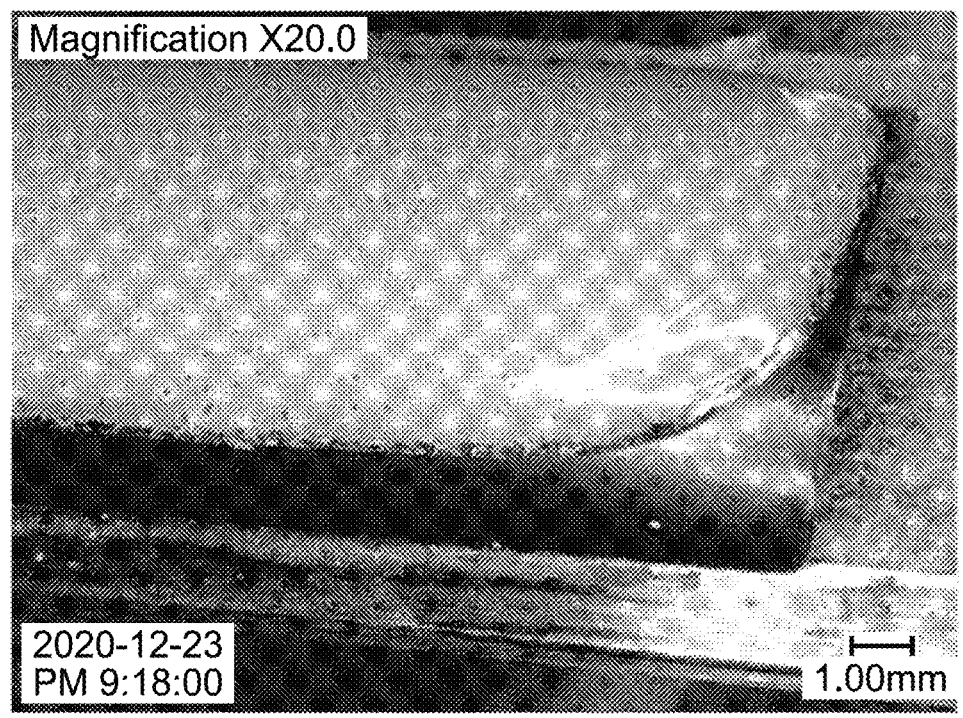
FIGS. 11 and 12 are photographs before/after evaluation of wear of the nail art of Example 1, respectively.
Figure 12:
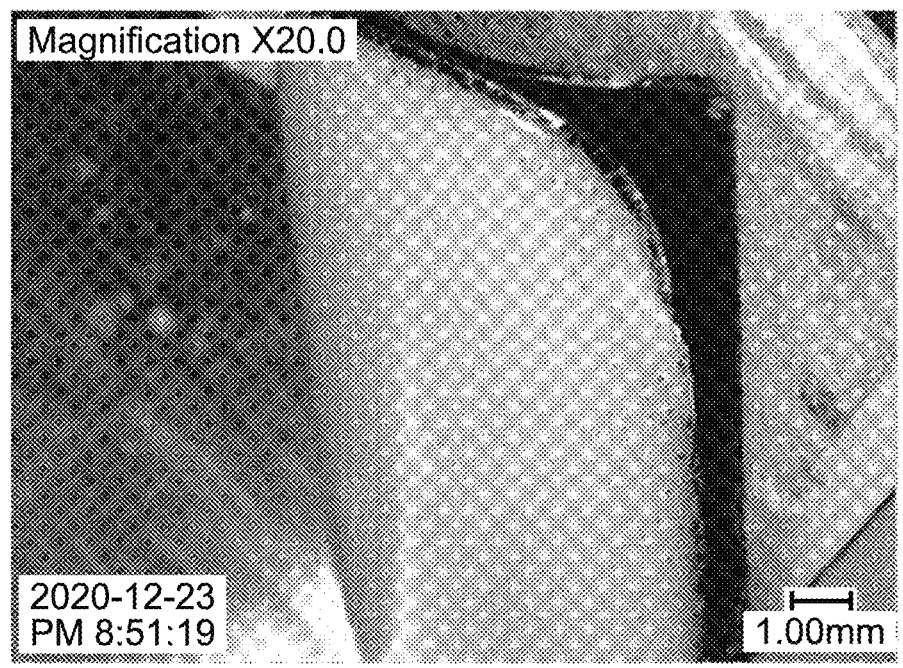
Figure 13:
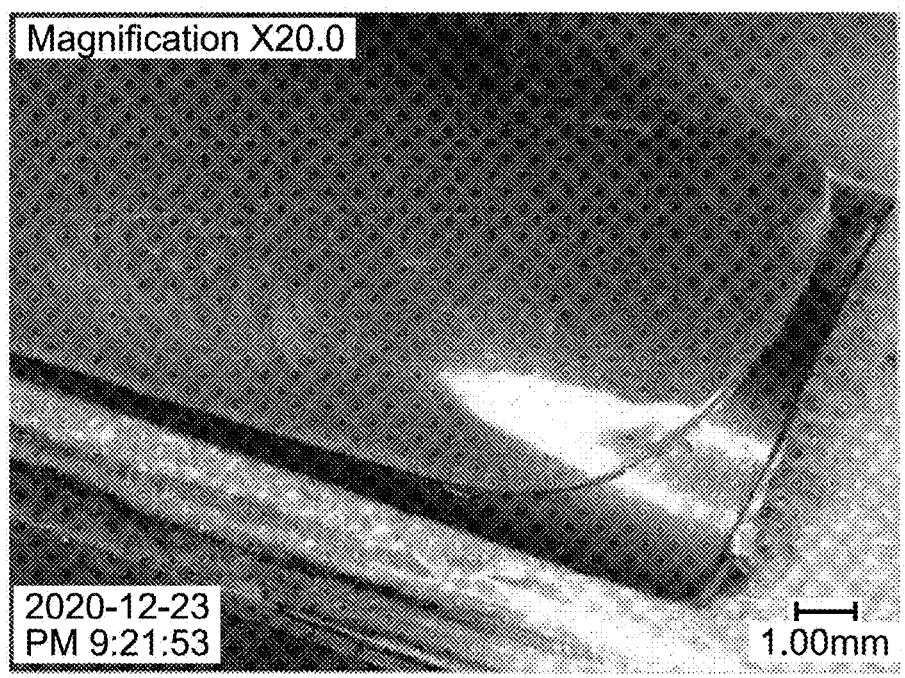
FIGS. 13 and 14 are photographs before/after evaluation of wear of the nail art of Comparative Example 2, respectively.
Figure 14:
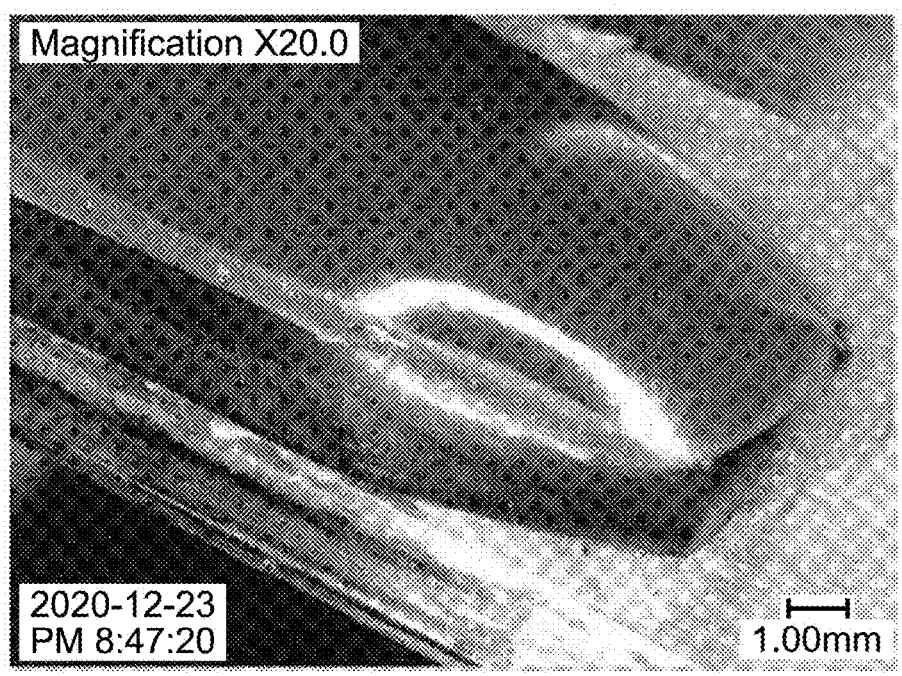

The thus-manufactured nail art was deformed to fit a nail model, and irradiated with UV to be cured. Thereafter, a side surface of the nail art was rubbed for a certain period of time and a wear degree was confirmed by a photograph. A photograph before the experiment of Example 1 is FIG. 11 and a photograph after the experiment is FIG. 12, and a photograph before the experiment of Comparative Example 2 is FIG. 13 and a photograph after the experiment is FIG. 14. It was found that in Example 1, almost no wear occurred, but in Comparative Example 2, the side surface was severely worn out.

DESCRIPTION OF SYMBOLS

100: nail art
110: coating layer
120: substrate layer
100': laminate
110': pre-coating layer
120': pre-substrate layer
400: mold
300b: upper plate
300a: lower plate
500: process film
600: buffer layer

The invention claimed is:

1. A method for preparing a nail art, the method comprising: applying a pressure to a laminate including a pre-substrate layer and a pre-coating layer by a mold to form a nail art including a substrate layer and a coating layer from the laminate, wherein when the pressure is applied, a temperature of the mold is 55° C. to 170° C., and the pressure is applied at 6 MPa to 12 MPa, wherein a pressing surface of the mold is in a form having an outer periphery and an inner periphery spaced apart from the outer periphery, the width of the pressing surface is 0.3 mm to 1.5 mm; and wherein the pressure is applied for between 1 to 20 seconds such that an outer periphery of the nail art achieves a gentle curve.

2. The method for preparing a nail art of claim 1, further comprising: before applying the pressure, disposing at least one or more process films between the pre-coating layer and the mold.

3. The method for preparing a nail art of claim 2, wherein a melting point of the process film is higher than the temperature of the mold.

4. The method for preparing a nail art of claim 2, wherein one to three process films are disposed between the pre-coating layer and the mold.

5. The method for preparing a nail art of claim 2, wherein the process film has a thickness of 9 μm to 188 μm.

6. The method for preparing a nail art of claim 5, wherein the pre-coating layer includes a UV-curable raw material, a photoinitiator, and a resin.

7. The method for preparing a nail art of claim 6, wherein the pre-coating layer includes:
30 wt % to 58 wt % of the UV-curable raw material,
0.1 wt % to 20 wt % of the photoinitiator, and
40 wt % to 55 wt % of the resin, in a solid content.

8. The method for preparing a nail art of claim 6, wherein the UV-curable raw material includes at least any one selected from the group consisting of urethane acrylate-based oligomers, polyester acrylate-based oligomers, polyether acrylate-based oligomers, epoxy acrylate-based oligomers, polycarbonate acrylate-based oligomers, silicone acrylate-based oligomers, and acryl acrylate-based oligomers.

9. The method for preparing a nail art of claim 6, wherein the UV-curable raw material includes the urethane acrylate-based oligomer.

10. The method for preparing a nail art of claim 6, wherein the photoinitiator has an absorption wavelength band in a range of 200 nm to 600 nm.

11. The method for preparing a nail art of claim 6, wherein the resin includes at least any one selected from the group consisting of acryl-based resins, nitrocellulose resins, urethane-based resins, acetic acid resins, ester-based resins, vinyl chloride resins, and styrene resins.

12. The method for preparing a nail art of claim 6, wherein the resin is a thermoplastic resin having a glass transition temperature ($T_g$) of 30° C. to 200° C.

13. The method for preparing a nail art of claim 5, wherein the substrate layer includes an adhesive layer.

14. The method for preparing a nail art of claim 13, wherein the substrate layer further includes a design layer disposed between the adhesive layer and the coating layer.

* * * * *